(12) United States Patent
Fishman

(10) Patent No.: US 7,954,660 B2
(45) Date of Patent: Jun. 7, 2011

(54) GAS CAP AND COMPONENTS THEREFOR

(75) Inventor: Joseph Fishman, Scarborough (CA)

(73) Assignee: Fishman Thermo Technologies Ltd., Misgav Post (IL)

( * ) Notice: Subject to any disclaimer, the term of this patent is extended or adjusted under 35 U.S.C. 154(b) by 1073 days.

(21) Appl. No.: 11/728,658

(22) Filed: Mar. 27, 2007

(65) Prior Publication Data
US 2008/0237179 A1 Oct. 2, 2008

(51) Int. Cl.
*B65D 41/04* (2006.01)
*B65D 53/02* (2006.01)
(52) U.S. Cl. .................................. 220/304; 220/86.2
(58) Field of Classification Search .................. 220/304, 220/86.1, 86.2
See application file for complete search history.

(56) References Cited

U.S. PATENT DOCUMENTS

| 4,796,777 | A | * | 1/1989 | Keller | 220/203.2 |
|---|---|---|---|---|---|
| 4,877,146 | A | * | 10/1989 | Harris | 220/746 |
| 5,449,086 | A | * | 9/1995 | Harris | 220/288 |
| 6,357,618 | B1 | * | 3/2002 | Kloess et al. | 220/562 |
| 6,508,374 | B1 | * | 1/2003 | Griffin et al. | 220/304 |
| 7,025,222 | B2 | * | 4/2006 | Hagano et al. | 220/375 |
| 7,290,673 | B2 | * | 11/2007 | Hagano | 220/288 |
| 2002/0175165 | A1 | * | 11/2002 | Jones | 220/304 |
| 2004/0262312 | A1 | * | 12/2004 | Hagano et al. | 220/293 |
| 2005/0011896 | A1 | * | 1/2005 | Yoshida et al. | 220/304 |
| 2006/0037959 | A1 | * | 2/2006 | Hokazono et al. | 220/303 |

* cited by examiner

*Primary Examiner* — Anthony Stashick
*Assistant Examiner* — Niki M Eloshway
(74) *Attorney, Agent, or Firm* — Hoffmann & Baron, LLP

(57) ABSTRACT

A plastic gas cap having a cap element with a plastic skirt having an inner skirt diameter and including ring retaining tabs extending inwardly from the inner skirt, a plug element having a flange at one end sized and shaped to fit within the plastic skirt and past the ring retaining tabs; and a plastic retaining ring having an outer ring diameter and being secured between the flange and the tabs to secure the plug element in the cap element by an interference fit within the inner skirt diameter which reinforces said plastic skirt and makes it more rigid.

14 Claims, 2 Drawing Sheets

GAS CAP AND COMPONENTS THEREFOR

FIELD OF THE INVENTION

This invention relates to gas caps, and in particular to gas caps of the sort used in vehicles to close the mouths of fuel refilling tubes of the sort found on automobiles and other types of vehicles. Most particularly this invention is directed to such gas caps that are made out of noncorroding plastic components.

BACKGROUND OF THE INVENTION

Internal combustion engines typically require liquid fuel to operate. Typically the fuel is contained in a fuel tank adjacent to the engine. The fuel tank is sized to permit the internal combustion engine to operate for a predetermined amount of time. However, once the liquid fuel in the fuel tank is used up, it becomes necessary to replenish the fuel in the fuel tank. Typically a filling tube is provided for this purpose with a mouth sized and shaped to receiving a refueling nozzle from a gas pump, for example, of the type found at conventional filling stations. When the filling tube is not being used, a fuel cap or gas cap is used to close the mouth of the filling tube to prevent evaporation and spilling of the fuel. Although many types of gas caps have been made in the past modern gas caps are typically provided with external threads, which mate with internal threads formed on the inside of the mouth of the filling tube, whereby the gas cap can be screwed into place. Most modern gas caps are also provided with a slip mechanism, which prevents the gas cap from being over-tightened in the filler tube.

In the past gas caps and filler tubes were typically made from metal, with the exception of a compressible elastomeric gasket that was used to ensure a vapour tight seal around the mouth of the filler tube. However, over time, as plastics have become of better quality and higher strength, noncorroding plastic has replaced many of the corrodible metal elements of the filler tube and gas cap, until gas caps are now made almost entirely out of plastic. Plastic has certain advantages as a gas cap including being completely resistant to corrosion and being somewhat less expensive.

Although mostly made from plastic, certain metal elements remain in use in gas caps. Specifically, the gas cap can be made with a plastic handle portion with a depending skirt or lip and a plastic plug portion on which the threads are formed. However, to provide enough strength it has been necessary to use metal components in the gas cap assembly as structural elements. The plastic was simply not strong enough, given the designs of gas caps, to be used. However, using metal in combination with the plastic is not the best solution as the metal components will still tend to corrode and weaken over time and can lead to premature failure of the gas cap, even though the remaining plastic components are not corroded. Further metal is more expensive than plastic.

What is desired is some method and apparatus for replacing the metal structural elements with plastic elements. What is desired is a design for a gas cap which permits a noncorroding material such as plastic, to be used, without compromising the structural strength of the gas cap.

SUMMARY OF THE INVENTION

According to the present invention there is provided a plastic gas cap design in which plastic elements are used as structural elements. The gas cap is easy to assemble and yet is quite strong and robust. The present invention uses an inexpensive long lasting plastic element to both secure and reinforce the gas cap construction. The plastic component is easy to assemble with the remaining plastic structural elements and firmly and securely retains the components in place and unlike the corresponding metal component design does not corrode and is less expensive to manufacture. Further even though the design incorporates plastic elements in place of metal or steel, it presents a robust and strong design that can stand up well to expected loads and general wear and tear.

Therefore according to a first aspect of the present invention there is provided a plastic gas cap comprising:

A cap element having a plastic skirt, said plastic skirt having an inner skirt diameter and including ring retaining means extending inwardly from said inner skirt diameter;

A plug element having a flange at one end sized and shaped to fit within said plastic skirt past said ring retaining means; and A plastic retaining ring having an outer ring diameter, said plastic retaining ring being secured between said flange and said inwardly directed ring retaining means to secure said plug element in said cap element; Wherein said outer ring diameter is sized and shaped to form an interference fit within said inner skirt diameter to reinforce said plastic skirt.

According to a further aspect of the present invention there is provided a plastic gas cap comprising:

A cap element having a plastic skirt, said plastic skirt having an inner skirt diameter and including ring retaining means extending inwardly from said inner skirt diameter;

A plug element having a flange at one end sized and shaped to fit within said plastic skirt past said ring retaining means; and A plastic retaining ring having a curved slip surface and a locking surface;

Wherein said curved slip surface permits said plastic retaining ring to slip past said ring retaining means until said locking surface can engage and lock with said ring retaining means.

BRIEF DESCRIPTION OF THE DRAWINGS

Reference will now be made to preferred embodiments of the invention, by way of example only, in which.

DETAILED DESCRIPTION OF THE PREFERRED EMBODIMENTS

Figure 1:
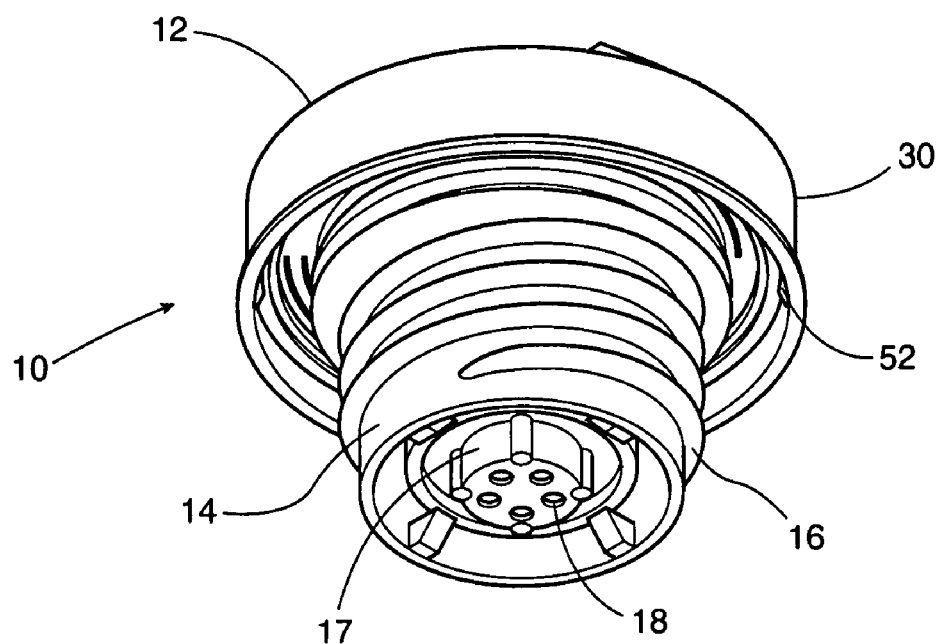
FIG. 1 is view of an assembled gas cap according to one aspect of the present invention.

FIG. 1 shows a gas cap 10 according to the present invention. The gas cap 10 includes a top portion or cap element 12, and a plug portion 14. The plug portion is externally threaded with threads 16. The threads 16 are sized and shaped to mate and engage with corresponding threads formed on the mouth of a filler tube (not shown) in a known manner. It will be appreciated by those skilled in the art that while the following description makes reference to a vehicle fuel tank gas cap that the present invention is not limited to use on vehicles. Any fuel tank that is designed to store volatile fuel and that has a filler tube will be suitable for a gas cap of the present invention. Thus, the present invention has application to portable electrical generators, gardening machines and the like in addition to all forms of vehicles and all such applications are comprehended by the present invention. However, the primary commercial application is expected to be vehicles such as cars and trucks.

FIG. 1 shows a valve assembly 17 inside the plug portion 14 with inlet openings 18. The inlet openings 18 provide a vapour passage way for a pressure release of the internal vapour pressure which might otherwise accumulate under the gas cap 10 when the plug is sealed in place in the filler tube and thereby seals the fuel tank. However, the present invention is not directed to any specific pressure release valve mechanism and so it is not explained in any more detail. The present invention will be suitable for both pressure release safety gas caps as well as solid gas caps without pressure release valves, depending upon the application, as will be understood by those skilled in the art.

Figure 2:
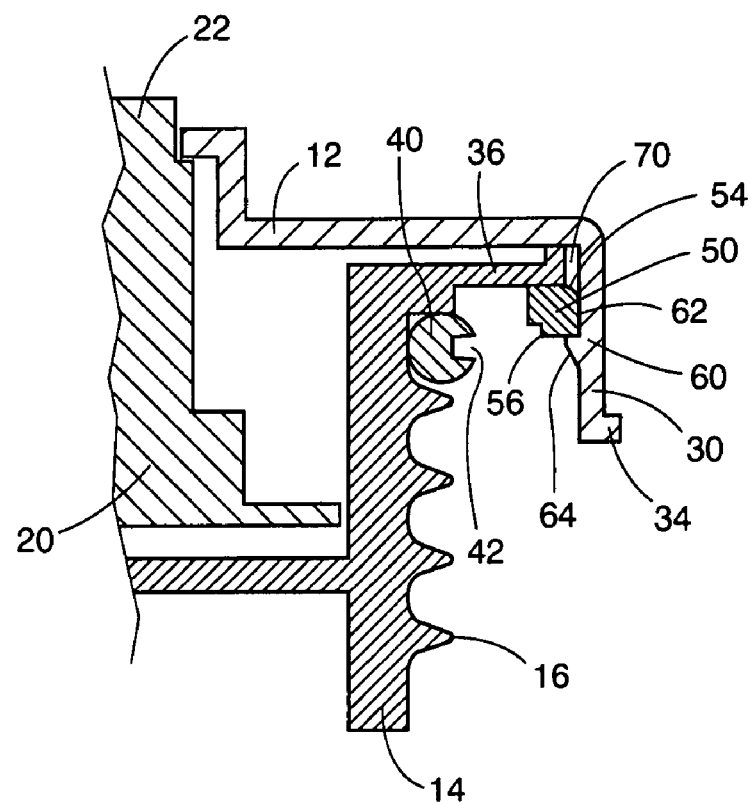
FIG. 2 is a side view of the gas cap of FIG. 1 in cross section, showing the components of the present invention.

Turning to FIG. 2 a cross-section of the gas cap 10 of FIG. 1 is shown. The top portion 12 is shown with the plug element 14 with the threads 16. The pressure release plunger 20 is also shown schematically. Typically a biasing element will be used to cause the plunger to be seated in a sealing position and the action of the user in touching the handle 22 to remove the gas cap from the filler tube will permit the vapour pressure in the fuel tank (not shown) to be safely released before the gas cap is removed from the filler tube, thereby eliminating any sudden pressure change which could otherwise cause bubbling in the fuel and spilling or worse an expulsion of fuel out from the open mouth of the filler tube.

As can be seen in FIG. 2 the top portion 12 of the gas cap includes a downwardly extending skirt section 30 with an enlarged lower lip 34. The skirt is preferably made from molded plastic and the lower lip 34 acts to reinforce the edge of the skirt section 30 and is molded in as the gas cap is initially formed. The skirt section 30 defines an opening that extends downwardly and which is characterized by an inner diameter 32 (see FIG. 3). As can be seen from FIG. 1 it is preferred to form the gas cap 10 in the form of a circular device, but other shapes are also comprehended, provided that the top of the filling tube is adequately sealed as described in more detail below.

Figure 3:
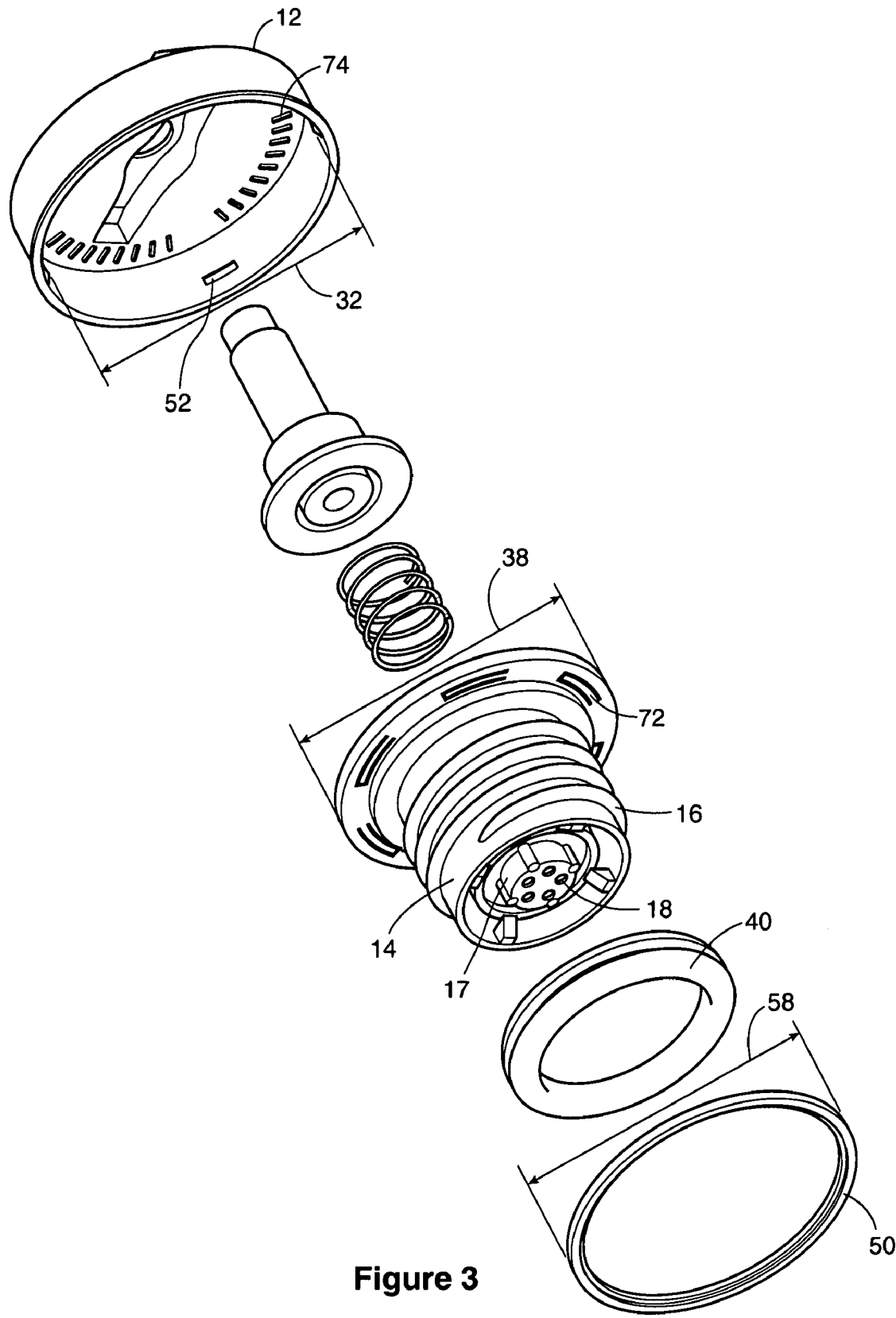
FIG. 3 is an exploded view of the gas cap of FIGS. 1 and 2 showing how the components of the present invention are assembled together.

The plug portion 14 includes a flange 36, extending outwardly from the threaded portion and which defines an outer diameter 38 (see FIG. 3). It will be seen that the inner diameter 32 of the skirt is larger than the outer diameter 38 meaning that the flange portion of the plug 16 fits within the skirt of the top portion 12 of the plug assembly 10. Also shown is an elastomeric sealing ring 40, which is located towards a base of the threaded portion in a groove 42. The sealing ring 40 may have a notch 42 to improve its compressibility in a known manner. The purpose of the sealing ring 40 is to seal between the upper end of the filling tube and the threads when the plug is fully threaded into the filling tube. Thus, in the event that any fuel vapours could work their way around or between the interengaged threads of the filler tube and the plug portion to the mouth of the filling tube, the sealing ring 40 will stop such vapours from actually escaping free from the filling tube.

Also shown in FIG. 2 is one embodiment of a retaining ring 50 according to the present invention. Unlike in prior art structures the retaining ring of the present invention is made from molded plastic and preferably is injection molded, making it easy and inexpensive to produce. The use of injection molding also permits the retaining rings to be produced to within close dimensional tolerances. As explained in more detail below improved results are obtained with such close tolerances.

The most preferred form of the ring retaining 50 is an integrally formed fibre reinforced thermoplastic ring having a curved slip surface 54 and a locking surface 56. The preferred material is a form of composite material like fibre reinforced plastic, made of plastic reinforced with fine fibers of material such as glass or graphite. The fibers can be in the form of chopped strand mats or woven fibre mats. The two materials act together, with the plastic resin being strong in compression and the fibres being strong in tension and shear. Thus the combination of material results in a composite structure that is strong in both compression and in shear, which is an important property for the instant invention. A preferred form of plastic is high strength nylon with glass fibre reinforcing. For example adequate results have been achieved with Nylon™ plastic reinforced with between 25 to 45% by weight of glass fibre, most preferably about 30% by weight of glass. The most preferred material is one that is high strength and also somewhat low friction to ease the assembly as described in more detail below. The retaining ring 50 also defines an outer diameter 58 (see FIG. 3). The surfaces 54 and 56 and the diameter 58 all provide functional elements to permit the present invention to achieve the desired results. However, it is necessary to describe the other elements of the gas cap in more detail before these can be properly understood.

FIG. 1 shows inwardly directed ring retaining means 52 mounted on the depending skirt section 30 according to the present invention. The ring retaining means 52 includes (as seen in FIG. 2), in a preferred embodiment, tabs 60 located in at least two, and preferably four, inwardly directed locations spaced about the inner periphery of the skirt 30. The tabs 60 have a particular shape and function as described below. In the preferred form the tabs 60 include a step or stop surface 62 located towards a top or inside of the gas cap 10, and, a tapered support or ramp section 64 extending up to the stop surface 62 from the inner wall. The stop surface 62 is located closer to the handle and the ramp section 64 is located closer to the opposite or plug end.

The interaction of the retaining ring 50 and the ring retaining means 52 can now be understood. As noted above the skirt 30 defines a circular opening having an internal diameter 32. The retaining ring has an outer diameter 58. According to the present invention it is preferred to make outer diameter 58 at least as large as, and most preferably slightly larger than the inner diameter 32. In this way the retaining ring forms at least a contact fit and more preferably an interference fit with the skirt. In the preferred fit the ring is slightly compressed when inserted into the inner diameter and exerts an outward force and hoop stress on the skirt 30 which has the effect of reinforcing and stabilizing the skirt 30. It is most preferred to have an interference fit of less than one millimetre most preferably about 0.4 to 0.6 millimetres. Of course the size depends to some extent on the size of the plug and these preferred dimensions are appropriate for a convention automobile gas caps. For much larger or smaller gas caps the size of the interference fit might need to be varied as will be understood by those skilled in the art.

As will now be appreciated the flange portion 36 of the plug portion 14 includes gaps or apertures 70 which permit the flange portion 36 to be easily fit around and inserted into the inner diameter of the skirt 30, past the tabs 60. However, to be able to exert the hoop stress and to have the desired strength, no such gaps are made in the retaining ring 50. Instead, through a combination of the inherent resiliency of the plastic used in both the ring 50 and the skirt 30 and the interaction between the ramp section 64 and the curved slip surface 54, it has been found possible to simply force the retaining ring past the tabs 60 and into place, where the stop surface 62 of the tab 60 abuts the locking surface 56 of the retaining ring 50. In this manner an interference fit is obtained, by means of elastic deformation of the interfering components as they are being assembled. In terms of the fit, the fit can range between mere contact about the ring, to a rigid or braced interference fit of one or two millimeters. Pushing the ring past the tabs can be difficult, which is why a low coefficient of friction plastic is preferred such as nylon or teflon.

As can now be appreciated the preferred interference fit between the outer diameter of the retaining ring and the inner diameter of the skirt 30 needs only to exist in that portion of the lip between the tabs 60 and the top end of the plug. The stop surface of the tab 60 needs to be spaced far enough from the end of the underside of the top flange to accommodate two things, namely the thickness of the retaining ring and the thickness of the flange. Thus when in position the retaining ring holds the flange in place about its periphery therefore preventing the plug from being separated from the handle of the gas cap. Thus, the ring holds the two main components of the gas cap together.

In addition, as stated above, the outer diameter of the ring is slightly larger than the inner diameter of the skirt above the tabs 60 according to the present invention. Thus, the retaining ring is sized and shaped so that the retaining ring 50 pushes outwardly on the skirt 30 to reinforce and stabilize the same and also secures the flange 36 within the skirt 30 and most preferably against the top portion 12 of the gas cap. It is most desirable to prevent the plug portion from turning inside the top portion, when undoing the gas cap from the filler tube and to permit the plug to slip within the top portion to prevent over tightening of the gas cap within the filler tube.

In some cases it may not be necessary to provide such an overtighten protection feature, but the present invention comprehends gas caps with and without such an over tightening feature. Such features are known in the art and include for example teeth 72 (see FIG. 3) on the plug portion that engage grooves 74 (see FIG. 3) on the top portion in such a manner as to allow the plug to slip past the top portion in the tighten direction, but prevent the same from happening in the untighten direction. The relevance of this to the present invention is simply that the ring of the present invention needs to be provided with a height that permits enough space between the flange and the top portion of the gas cap to operate in this manner. Of course, in the absence of such an overtighten release mechanism, the position of the ring and the tabs 60 can be designed so the ring presses the flange of the plug portion into nonmoving engagement with the top portion, so that the gas cap acts as a single unitary device.

It will now be appreciated that the present invention provides a retaining ring which is more rigid and brittle than one made from all plastic without the fibre reinforcing. It is most preferred if the ring is strong enough so that the only way to remove it from the cap element is to break it. The advantage of the present invention, over for example a metal retaining ring can now be better understood. In particular the plastic is more elastic and can more easily be deformed to fit into the cap in the first place; a metal ring would not be able to deform to fit into an interference fit as taught by this invention.

The foregoing description is in reference to preferred embodiments of the invention and it will be understood by those skilled in the art that many variations and alterations are possible without departing from the broad scope of the claims as appended hereto. For example, while reference has been made to glass reinforced plastic as a preferred composite material, graphite reinforced plastic is also comprehended as a composite material for the retaining ring. What is believed important is to provide a material which is strong enough in shear, and yet elastic enough to be compressed to fit past the retaining tabs on the one hand and to resist the strains of everyday use without failing on the other hand. The interference fit also adds considerable strength and rigidity to the overall gas cap, and particularly the skirt thereof.

The embodiments of the invention in which an exclusive property or privilege is claimed are defined as follows:

1. A plastic gas cap comprising:
   a cap element having a plastic skirt, said plastic skirt having an inner skirt diameter and including ring retaining means extending inwardly from said inner skirt diameter;
   a plug element having a flange at one end sized and shaped to fit within said plastic skirt past said ring retaining means;
   a plastic retaining ring having an outer ring diameter, said plastic retaining ring being secured between said flange and said inwardly directed ring retaining means to secure said plug element in said cap element, wherein said plastic retaining ring is made from glass reinforced plastic
   wherein said outer ring diameter is sized and shaped to form an interference fit within said inner skirt diameter to reinforce said plastic skirt;
   wherein said flange includes engaging means for permitting said flange to slip within said gas cap in the tightening direction, but not in the untightening direction; and
   wherein said engaging means comprise teeth oriented to engage in slots formed into the gas cap.

2. The plastic gas cap of claim 1 wherein said interference fit is between 1 and 3 millimeters.

3. The plastic gas cap of claim 1 wherein said interference fit is two millimeters.

4. The plastic gas cap of claim 1 wherein said ring includes a slip surface and a locking surface in cross section.

5. The plastic gas cap of claim 4 wherein said slip surface is a smoothly curved surface to facilitate passing said ring past said inwardly extending ring retaining means.

6. The plastic gas cap of claim 5 wherein said inwardly extending ring retaining means are in the form of a tab, having a sloped surface and a stop surface.

7. The plastic gas cap of claim 1 wherein said ring includes a locking surface to engage said stop surface after said ring is slipped past said tab.

8. The plastic gas cap of claim 1 wherein said ring includes a locking surface to engage said stop surface after said ring is slipped past said tab.

9. A plastic gas cap comprising:
   a cap element having a plastic skirt, said plastic skirt having an inner skirt diameter and including ring retaining means extending inwardly from said inner skirt diameter;
   a plug element having a flange at one end sized and shaped to fit within said plastic skirt past said ring retaining means; and
   a plastic retaining ring having an outer ring diameter, said plastic retaining ring being secured between said flange and said inwardly directed ring retaining means to secure said plug element in said cap element;
   wherein said outer ring diameter is sized and shaped to form an interference fit within said inner skirt diameter to reinforce said plastic skirt;
   wherein said flange includes engaging means for permitting said flange to slip within said gas cap in the tightening direction, but not in the untightening direction; and wherein said engaging means comprise teeth oriented to engage in slots formed into the gas cap.

10. The plastic gas cap of claim 9 wherein said interference fit is between 1 and 3 millimeters.

11. The plastic gas cap of claim 9 wherein said interference fit is two millimeters.

12. The plastic gas cap of claim 9 wherein said ring includes a slip surface and a locking surface in cross section.

13. The plastic gas cap of claim 12 wherein said slip surface is a smoothly curved surface to facilitate passing said ring past said inwardly extending ring retaining means.

14. The plastic gas cap of claim 13 wherein said inwardly extending ring retaining means are in the form of a tab, having a sloped surface and a stop surface.

* * * * *